(No Model.)

J. N. MOODY.
DISH CLEANER.

No. 537,299. Patented Apr. 9, 1895.

Witnesses
Anna E. Canan
Meadie E. Hapgood

Inventor—
James N. Moody
by Irwin Taylor
Attorney

UNITED STATES PATENT OFFICE.

JAMES N. MOODY, OF TOPEKA, KANSAS.

DISH-CLEANER.

SPECIFICATION forming part of Letters Patent No. 537,299, dated April 9, 1895.

Application filed July 2, 1892. Serial No. 438,767. (No model.)

*To all whom it may concern:*

Be it known that I, JAMES N. MOODY, a citizen of the United States, residing at Topeka, in the county of Shawnee and State of Kansas, have invented a new and useful Improvement in Dish-Washing Machines, of which the following is a specification.

My invention relates to improvements in dish washing machines in which the dishes to be washed are placed in a cylindrical shaped vessel, which vessel is rotated in another vessel containing suds, by means of a crank handle; and the objects of my improvements are to provide in a cylindrical shaped vessel containing dishes (which is revolved in an outer vessel containing suds) a series of loose partitions for holding dishes separate and an adjustable frame for securing them from rattling more fully described in the specifications hereinafter set forth.

Figure 1:
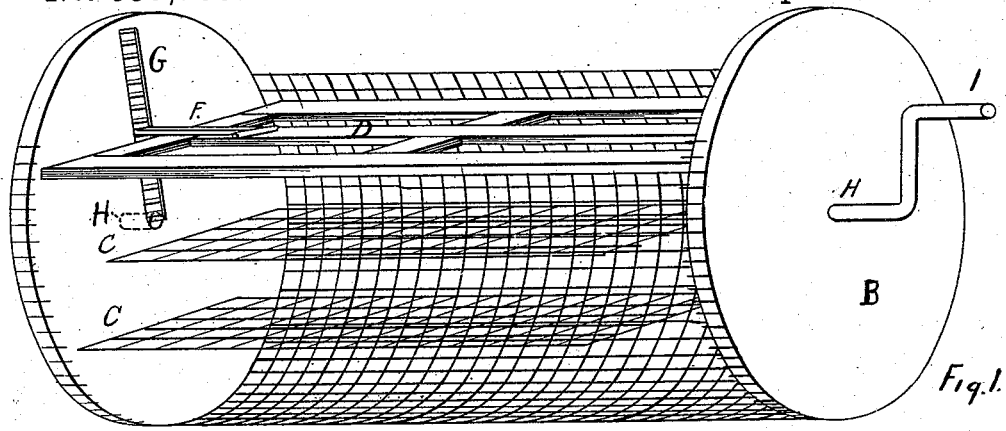
Figure 2:
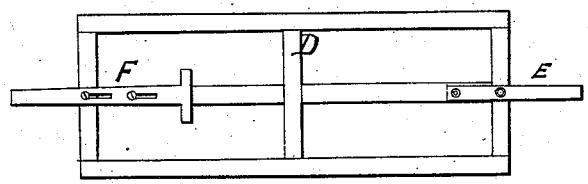
Figure 3:
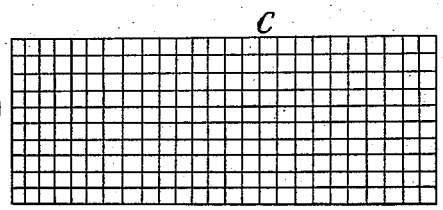
Figure 4:
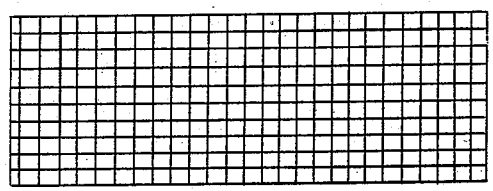
Figure 5:
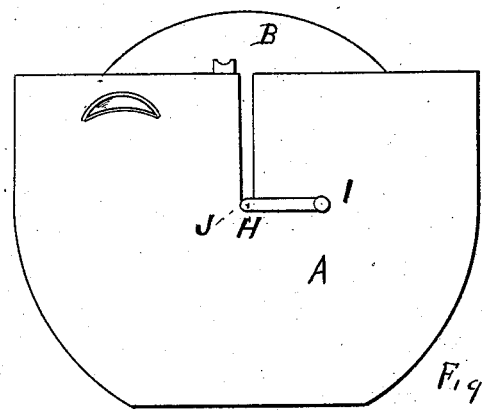
Figure 6:
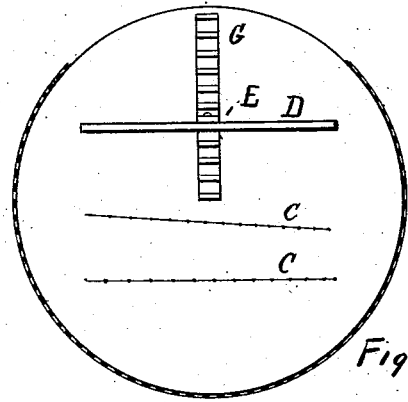

Figure 1 represents the cylinder in which dishes are to be placed. This view shows the cylinder with the partitions in the same and the wire removed from the side. Fig. 2 shows the detachable cover. Figs. 3 and 4 show the wire partitions. Fig. 5 shows the machine ready for use and is an end view. Fig. 6 shows a sectional view of the cylinder.

Similar letters refer to similar parts throughout the several views.

A is a vessel, capable of containing suds and having journal bearings at each end, in which journal bearings the cylindrical vessel containing dishes is placed and revolves.

B is a cylindrical shaped vessel made of coarse screen wire for the sides and wooden disks for each end, which screen wire on the sides incases the ends except about one-third of the same, leaving an opening in this vessel for dishes to be inserted.

C C are loose partitions made of screen wire, for the purpose of separating the layers of dishes that are placed in the vessel B.

D is a frame, forming a top for vessel B, being simply a rectangular wooden frame with a spur E at one end, and having a sliding bolt F working on the other end.

E is a spur on one end of frame D, that is inserted in rack G.

F is a sliding bolt on the other end of frame D, that is inserted in a corresponding rack G.

G G are racks, one inserted on the inside of vessel B at each end on each disk, and rigidly secured thereto.

H is a journal upon which vessel B rotates.

I is a crank by means of which vessel B is rotated and operated.

J is journal bearing in vessel A, in which journal bearing journal H of vessel B rotates.

To operate my machine the cover D of vessel B is removed, the loose partitions C C are removed, and a layer of dishes is placed in the bottom of vessel B. The loose partition C is then placed above them and another layer of dishes is placed in vessel B. Another loose partition C is then placed over these dishes. Another layer of dishes is then placed in vessel B, and the cover D is placed over the upper layer of dishes to be washed. A slight pressure is then exerted upon one end, and the spur E is inserted in rack G. The sliding bolt F is moved with the thumb and pressed down so as to obtain the proper pressure upon the dishes underneath and prevent their rattling; and then, by the pressure of the thumb, the bolt F is pushed into the other rack G, and holds the dishes firmly in their place. The vessel B is inserted in vessel A, the journal H into the journal bearings J. Hot water and suds are poured over the dishes to be washed. The crank is rapidly rotated, and the dishes are washed. To rinse them the vessel B may be lifted so as to bring the journal H on top of the ends of vessel A, when hot water is poured over the dishes, and they are slightly rotated as they are rinsed.

I am aware that it is not new to wash dishes with a rotating cylinder, and I do not claim any invention therefor; but the difficulty in all machines known to me is, that the vessel in which the dishes to be washed are placed, must have separate apartments with stationary partitions for the dishes; or if the partitions are loose the vessel must be full before it can be operated. I avoid this difficulty by the use of my adjustable cover D which adjusts itself to any number of dishes that may be inserted in vessel B, which is easily inserted and holds the dishes firm, keeps them from rattling, and by means of which two or three or a large number of dishes may be washed at the same time. In fact, it will be operated with one layer of dishes in it, or it may be filled to the top.

Having thus fully described my invention, what I desire to secure by Letters Patent, and claim, is—

In a dish-washing machine a cylindrical shaped vessel formed by two disks being incased about two-thirds of their circumference with wire screen with pivot journal on each disk in combination with a rack on each end and inside of the cylindrical shaped vessel, a frame forming a door for the cylindrical shaped vessel having a spur at one end of the frame to engage in one rack and a sliding bolt to engage and lock in the other rack, loose partitions in the cylindrical shaped vessel, a large vessel adapted to hold the cylindrical shaped vessel having journal bearings at each end in which the journals of the cylindrical shaped vessel revolves, a crank handle, all substantially as described.

JAMES N. MOODY.

Witnesses:
E. B. MIRRIAM,
P. H. FORBES.